Figure 6:
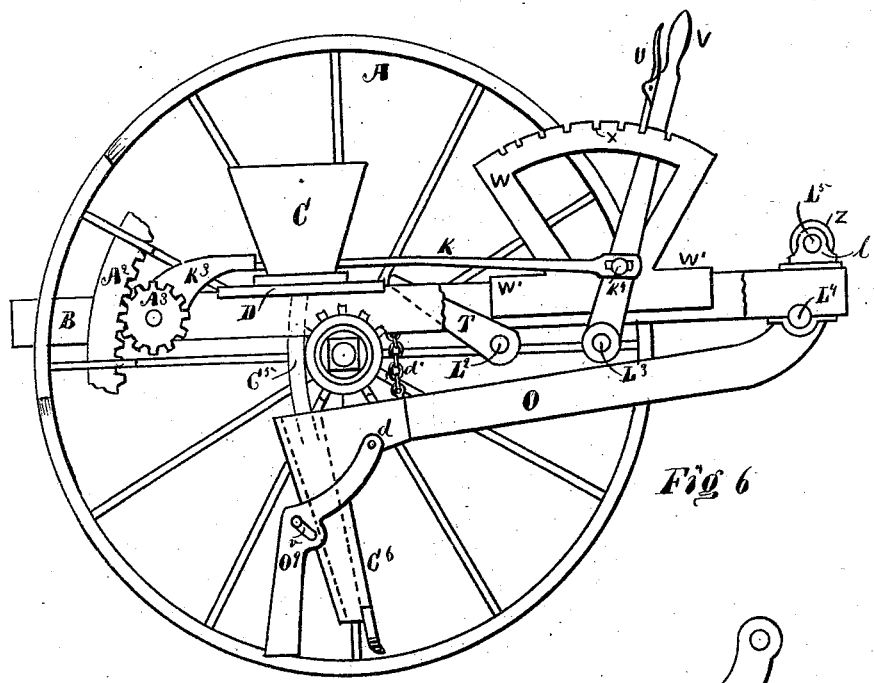

T. A. COLE.
CORN ROW-MARKER.
No. 188,502. Patented March 20, 1877.
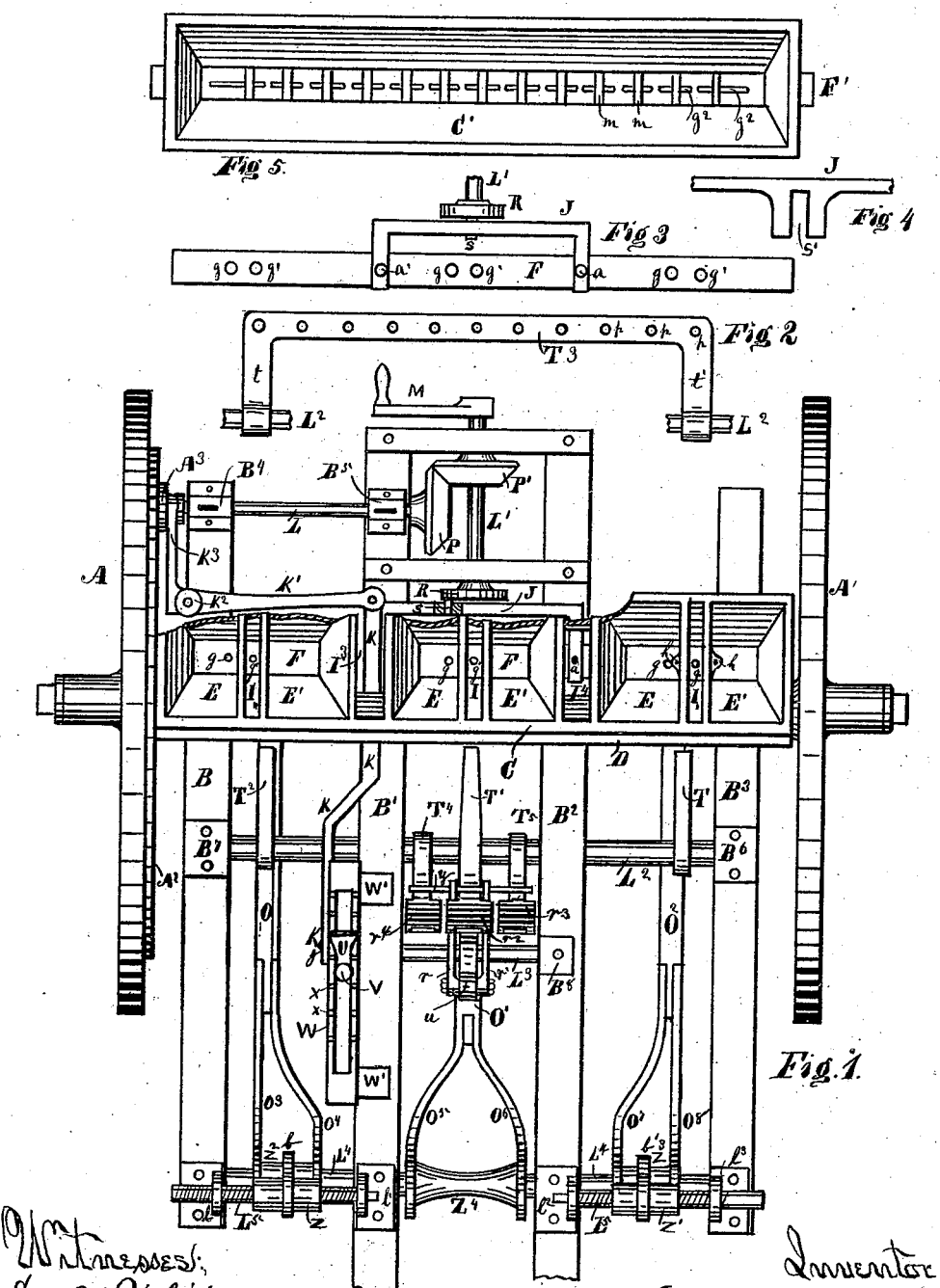

2 Sheets—Sheet 2.

T. A. COLE.
CORN ROW-MARKER.

No. 188,502. Patented March 20, 1877.

Witnesses
E. C. Whitney
John B. Powal

Inventor
Thomas A. Cole
Per E. C. Frink
his atty.

ved arms $O^3 O^4 O^5 O^6 O^7 O^8$

UNITED STATES PATENT OFFICE.

THOMAS A. COLE, OF TRAFALGAR, INDIANA.

IMPROVEMENT IN CORN-ROW MARKERS.

Specification forming part of Letters Patent No. 188,502, dated March 20, 1877; application filed July 20, 1876.

*To all whom it may concern:*

Be it known that I, THOMAS A. COLE, of Trafalgar, Johnson county, State of Indiana, have invented a new and useful Improvement in Corn-Row Marker, Corn and Wheat Drills, of which the following is a description, reference being had to the accompanying drawings.

The object of my invention is to get an even feed to the grain, and to regulate the width of the rows, and to operate the shovels, in passing over obstacles, by means of the foot of the operator, so as to remove all or any one of the shovels from contact with the ground or other obstructions, and to adapt the machine to a wheat-drill with a continuous even feed, or to use the machine as a regular planter to deposit grain in any quantity desired, or to mark corn-rows at regular distances apart; and my invention consists of the construction and arrangement of devices, and the manner in which they operate, as fully set forth in the claims hereunto annexed.

In the drawings, my invention is represented on two sheets.

Figure 7:
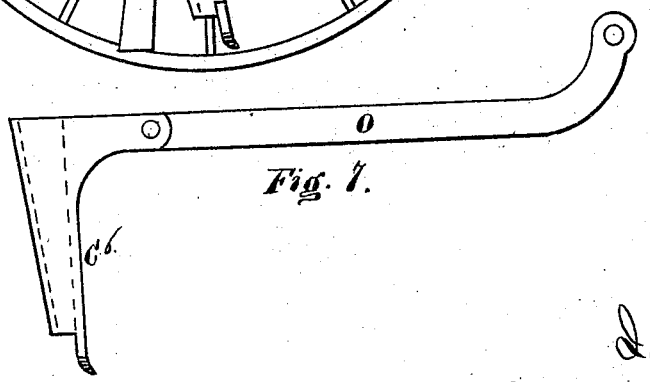

Figure 1 of Sheet 1 represents a plan view of my improved machine, showing the arrangement of the several parts in their relative positions. Fig. 2 of Sheet 1 represents an additional lifting-arm from the shovel-beams. Fig. 3 of Sheet 1 represents a detached view of the feed-bar and its operating connections. Fig. 4 of Sheet 1 represents part of the cam-operating device that is attached to the feed-bar. Fig. 5 of Sheet 1 represents a plan view of the seed-box and feed-bar as used to sow wheat. Fig. 6, on Sheet 2, represents a side elevation of Fig. 1 of Sheet 1. Fig. 7, on Sheet 2, is a side view of one of the shovels or hoes.

The main frame of my improved machine is formed of the bars or side sills $B B^3$, and the central bars $B^1 B^2$. These central bars $B^1 B^2$ extend forward sufficiently far as to form the shafts or tongue for the horses. All of these sills $B B^1 B^2 B^3$ are united together by a cross-bar of wood, D, over the axle, which is also secured to the lower part of the sills, and supports the frame on the axle and wheels $A A'$, as shown. At the front end of the sills $B B^1 B^2 B^3$, on the under side, is secured the shaft $L^4$, on which are pivoted the front ends of the shovel-beams $O O^1 O^2$ by means of the curved arms $O^3 O^4 O^5 O^6 O^7 O^8$, and between each set of these curved wings are sleeves $Z^2 Z^3 Z^4$, each sleeve connecting its own respective curved arms, that are united together farther back to their own respective shovel-beams $O O^1 O^2$, as shown. These sleeves $Z^2 Z^3 Z^4$ are each of them loose on the shaft L, so as to allow the shovel-beams to be elevated or depressed at their rear ends. The center plow-beam $O^1$ is not made adjustable sidewise; but each of the other shovel-beams $O O^2$ are adjustable sidewise, and to accomplish this each sleeve $Z^2 Z^3$ is provided with a link, $b$, which extends upward, and is so formed as to operate on the sleeve $Z^2 Z^3$, and to make connections with the adjustable screw-shafts $L^5$, located above the sills B, and operated in bearings $l\ l^1\ l^2\ l^3$, as shown. These links $b$ are attached to and form part of the nuts $Z Z^1$, and each nut $Z Z^1$ is made adjustable sidewise on the screws $L^5$, as shown, so as to move each of the side shovel-beams either closer to the center beam, or farther away, in order to regulate the space between the rows.

The shovel-beams $O O^1 O^2$ extend back, and at their rear ends are provided with the hollow shovels $C^6$, and to each of these hollow shovels $C^6$ is attached a scraper, $O^9$, which is formed with its upper end forked, so as to be attached to the front arm of the shovel $C^6$ by a pivot-joint, $d$, on each side, and these pivoted forks are united at the rear of the hollow shovel $C^6$, and are again provided with two forks, that extend downward below the end of the hollow part of the shovel $C^6$, and are so arranged as to scrape the dirt displaced by the shovel-points back on each side, and cover the seed that is dropped through the hollow part of the shovel. These forked scrapers, by being pivoted at $d$, and by having a segmental slot, $v$, near the center, are made adjustable as to the depth required of them to scrape the dirt.

Each of the shovel-beams is operated to be raised and lowered at their rear end by means of chains $d$, shown in Fig. 6 of Sheet 2. These chains are connected above to the ends of the lever-arms $T T^1 T^2$, said levers being attached to and operating on the shaft $L^2$—*i. e.*, the levers $T^2$ and T at the outer ends of the shaft $L^2$ are rigidly attached thereto, but the lever $T^1$ is only pivoted thereon, and the front end of this lever $T^1$ projects forward, and is curved upward to form a foot-rest, $r^2$, in such a manner that any pressure on the foot-rest $r^2$ causes it to move downward, thus elevating the rear end $T^1$ of the lever, and raising the shovel-beam $O^1$ at its rear end.

The shaft $L^2$ is in two sections, and the central end of each section is pivoted to the center lever $T^1$, and each section is supported by means of proper boxes $B^6$ $B^7$ on the outside sills, and by other boxes (not shown) on the under side of the central sills $B^1$ $B^2$, in such a manner as to allow each section of the shaft $L^2$ to operate independent of the other, and by this arrangement the central foot-lever $T^1$ operates on the central ends at the union of the two sections of the shaft $L^2$, and the foot-lever $T^5$ is attached and forms part of one section of the shaft $L^2$, and by this means, when operated by a pressure downward of the foot on the foot-rest $r^3$, causes the lever T, which is also attached to the same section of the shaft, to elevate the shovel-beam $O^2$, in the same manner as the central lever $T^1$, and the foot-lever $T^4$ and lever $T^2$ on the other section of the shaft $L^2$ are operated in the same manner to raise or lower the shovel-beam O, and when it becomes necessary to elevate all of the shovel-beams O $O^1$ $O^2$ at once, then the pressure of the foot is applied to the central foot-lever $T^1$, and all the shovel-beams are elevated by the arrangement of parts as follows, to wit: On each side of the central foot-lever $r^2$ are arranged links $r$ $r^1$, their rear ends being located under the side projections of the foot part of $r^2$ of the lever $T^1$, and are held in position by means of the rod $y$, which passes through the ends of the links $r$ $r^1$ above the levers $T^4$ $T^1$ $T^5$, as shown. The front end of the links $r$ $r^1$ is also pivoted to the lever-arm $u$ at its upper end, and the lower end of this lever $u$ is attached to and forms part of the shaft $L^3$, which is supported in proper boxes located under the central sills $B^1$ $B^2$, and by this arrangement of parts it will be seen that when it becomes necessary to raise all of the shovel-beams all that is required is to put sufficient pressure on the foot-rest $r^2$, and the bar $y$, being held above all the foot-levers, causes them all to be forced downward, thus causing the two sections of the shaft $L^2$ to operate their respective shovel-beams, and the central beam is operated independent of the others by the same movement of its own lever; but there is another means provided to operate the foot-levers $T^4$ $T^1$ $T^5$, as follows:

On the sill $B'$ is attached a quadrant, W, of any convenient form, the same as used in locomotives. The lever V is attached to, and forms part of, the shaft $Z^3$, and extends upward through the proper slot in the quadrant, and may be provided with any form of a locking or holding device, as the slide-catch U, in order to hold the lever in any required position, either forward or backward. And here it will be seen that any movement forward of the lever V will cause the shaft $L^3$ to partially revolve, carrying with it the lever-arm $u$, and thus will operate the foot-levers $T^4$ $T^1$ $T^5$, and raise the shovel-beams, and when thus raised they can be held in any desired position by means of the slide-catch U engaging in the notches X of the quadrant, as shown in Fig. 6 of Sheet 2. The lever V also performs another office—that of throwing out of gear the feed mechanism of the seed-box whenever the shovels are lifted out of contact with the ground, and thus stop any seed-grain from being wasted or deposited on the ground while the shovels are doing no work.

The manner in which the lever V performs this operation is as follows, to wit: Attached to the lever V at K, as shown in Fig. 6, Sheet 2, is the lever K, which extends backward under the feed-box, and is connected with the L-shaped lever $K^1$, as shown in Fig. 1, Sheet 1. The L-shaped lever $K^1$ is pivoted at $K^2$ to the bed D of the seed-box C, or to the sill B, and the L-shaped end $K^3$ operates as a clutch on the pinion $A^3$, to move it into or out of gear with the master-wheel $A^2$, and thus, it will be seen, when the lever V is thrown forward the pinion $A^3$ is moved out of gear, and the shovel-beams lifted, and when the lever V is moved back, then the pinion $A^3$ is moved into gear with the large wheel $A^2$, and the shovel-beams dropped.

On the upper side of the cross-bar D, (which is perforated with holes properly spaced,) is the feed-bar F. This feed-bar is operated by means of power communicated to it as follows, to wit: When the pinion $A^3$ is in gear with the master-wheel $A^2$, power is communicated to the shaft L, on the end of which is secured the miter-wheel P, and this wheel P meshes in gear with another miter-wheel, $P'$, which is attached to the shaft $L^1$, as shown in Fig. 1, each shaft being supported by suitable bearings, as shown. On the outside end of shaft $L^1$ is a crank, M, and on the inside end of the same shaft is another crank-wheel, R, provided with a wrist-pin, S. This wrist-pin S operates in the slot $S'$ of the feed-bar slide J, as shown in Fig. 1 and Fig. 4 of the drawings.

The feed-bar slide J is formed with two ends bent or cast at right angles to the slide, and these two ends are secured to the feed-bar F by means of bolts or screws $a$, in the manner shown in Fig. 3, and the rear edge of the feed-bar slide J has a projection downward, in which is formed the slot $S'$, to receive the wrist-pin S of the crank-wheel R, as shown in Fig. 4.

By this arrangement of parts it will be seen that the feed-bar F has imparted to it a reciprocating movement whenever the pinion $A^3$ is in gear with the master-wheel $A^2$, and that the feed-bar F remains at rest when the pinion $A^3$ is out of gear with the master-wheel. And by means of the rear crank M the operator is enabled to regulate the posi tion of the feed parts $g\ g'$ of the feed-bar F, so as to commence to drop seed at any desired starting-point, before the pinion $A^3$ is placed in gear with the master-wheel $A^2$.

The seed-box C is also of peculiar construction, it being made tapering on each side and each end, and is divided into several compartments, as follows, to wit: In the center of the feed-box is arranged two partitions inclosing the space I, and midway between this space and the ends of the box C there are two more spaces, I $I^2$, constructed in the same manner. The partitions on each side of these spaces I are perpendicular and parallel to each other, making the space I equal in width at all parts thereof; and midway between each of these spaces I are two other spaces, $I^3\ I^4$. The partitions of these spaces are inclined the same as the sides and ends of the box, thus presenting these openings wider at the bottom than at the top. This peculiar form of structure is to allow free play for the ends of the feed-bar slide J to operate in above the feed-bar F, as shown. But the other spaces I $I^1\ I^2$ are for an entirely different purpose, as follows: In the feed-bar F there are arranged a series of holes, $g\ g^1$, as shown, so arranged that when one of each set of these holes, as $g^1$, are in the spaces I, (where they communicate or make connection with holes in the bar D with the hose $C^5$ to the shovels $C^6$,) then the outer set of holes $g$ are in the seed-boxes E, where they receive their supply of seed, and when these holes $g$ are moved into the spaces I to deposit their contents, then the holes $g^1$ are in the feed-boxes $E'$ receiving their supply, and in order to prevent the grain from being crushed or bruised in its passage under the partitions of the spaces I, I have arranged a series of brushes attached to these partitions, as shown at $h\ h$ in Fig. 1. This arrangement of feed-box I use for planting corn and other seeds that should be regularly planted, but when wheat and other such seed has to be planted or sown, then I adopt the seed-box, as shown in Fig. 5. Here the box has no partitions, only slight tie-bars or small covering-partitions $m\ m$, that are arranged to be exactly over the holes in the bar D that lead to the shovels $C^6$, and the feed-bar F is formed with long slots $g^2\ g^2$, and when this bar is operated the same as bar F, then the seed is kept agitated and has a constant flow through the slots $g^2\ g^2$ and out through the holes in the bar D to the shovels $C^6$. When this feed-box is used, then there are other shovels $C^6$ attached to the sills B $B^1\ B^2\ B^3$, thus using as many shovels as there are feed-holes $g^2$ in the cross-bar D of the machine. When used as a wheat-drill, with extra shovels, then the lever-bar $T^3$ shown in Fig. 2 is attached to the shaft $L^2$, and operated in the same manner as before described to raise the shovel-beams of all the shovels up by means of chains $d'$ attached to said shovel-beams, and secured in the holes $p\ p$ of the lever $T^3$.

By this construction and combination of parts I am enabled to combine a corn-planter and seed-planter and wheat-drill in one machine, which forms a convenient and economical machine for farmers or planters, and also a corn-row marker by removing the scrapers $O^9$.

What I claim as new, and wish to secure by Letters Patent, is—

1. In combination, the shaft $L^4$, curved arms $O^3\ O^4\ O^5\ O^6\ O^7\ O^8$, arranged as described, and adapted to be operated in connection with the shovel-beams O $O^1\ O^2$, as set forth and described.

2. The adjustable dirt-scraper $O^9$, formed with pivot-bearing $d$ at the upper ends of the forks, and segmental adjusting-slot $v$ near its mid height, in combination with the hollow shovels $C^6$ attached to the shovel-beam, as set forth and described.

3. The links $r\ r^1$, arranged to operate under the projection of the part $r^2$ of the lever T, and held in position by means of the rod $y$ which passes through the ends of links $r\ r^1$ above the lever T, in the manner, and for the purposes set forth and described.

4. The feed-bar slide J, having its two ends at right angles to the slide, which are attached to the feed-bar F by bolts or screws, the rear edge of the slide J having a projection downward, in which is formed a slot, $S'$, to receive the wrist-pin S of the crank-wheel R, in the manner and for the purposes set forth and described.

5. In combination, the sleeve $Z^2$, shaft $L^4$, curved arms $O^3\ O^4$, link $b$, nut Z, and screw $L^5$, arranged and adapted to be operated for the purposes set forth and described.

6. In a corn and seed planter, the shaft $L^3$, arranged to be operated by the lever V and communicate motion to the shaft $L^2$, for the purposes specified, by means of the lever $u$, links $r\ r^1$, rod $y$, foot-levers $T^4\ T^1\ T^5$, in the manner set forth and described.

7. The foot-lever $T^1$, pivoted on the central ends of the two sections of the shaft $L^2$, and arranged to be operated in the manner and for the purposes set forth and described.

8. The combination of the foot-levers $T^4\ T^5$, rod $y$, and links $r\ r^1$, in the manner shown, for the purposes set forth and described.

In testimony whereof I have signed my name to this specification in the presence of two subscribing witnesses.

THOMAS A. COLE.

Witnesses:
  E. O. FRINK,
  E. C. WHITNEY.